US012061627B2

(12) United States Patent
Trim et al.

(10) Patent No.: US 12,061,627 B2
(45) Date of Patent: Aug. 13, 2024

(54) PHRASE BASED UNSTRUCTURED CONTENT PARSING

(71) Applicant: International Business Machines Corporation, Armonk, NY (US)

(72) Inventors: Craig M. Trim, Ventura, CA (US); Mary Rudden, Denver, CO (US); Anthony Stevens, San Francisco, CA (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 744 days.

(21) Appl. No.: 17/179,614

(22) Filed: Feb. 19, 2021

(65) Prior Publication Data
US 2022/0269698 A1    Aug. 25, 2022

(51) Int. Cl.
*G06F 16/28* (2019.01)
*G06F 16/901* (2019.01)
(Continued)

(52) U.S. Cl.
CPC ........ *G06F 16/285* (2019.01); *G06F 16/9024* (2019.01); *G06F 40/205* (2020.01); *G06F 40/44* (2020.01); *G06N 5/04* (2013.01)

(58) Field of Classification Search
CPC .... G06F 16/00; G06F 16/285; G06F 16/9024; G06F 40/00; G06F 40/205; G06F 40/44; G06N 5/00; G06N 5/04
See application file for complete search history.

(56) References Cited

U.S. PATENT DOCUMENTS 9,626,438 B2    4/2017  Magnaghi et al.
9,762,692 B2    9/2017  Fullagar et al.
(Continued)

FOREIGN PATENT DOCUMENTS

WO    2011126481 A1    10/2011

OTHER PUBLICATIONS

Prokhorov, Victor, Mohammad Taher Pilehvar, and Nigel Collier. "Generating knowledge graph paths from textual definitions using sequence-to-sequence models." arXiv preprint arXiv:1904.02996 (2019). (Year: 2019).*

(Continued)

*Primary Examiner* — Daniel C Washburn
*Assistant Examiner* — Sean E Serraguard
(74) *Attorney, Agent, or Firm* — Garg Law Firm, PLLC; Rakesh Garg; Michael O'Keefe

(57) ABSTRACT

From an unstructured content using an ontology, a forward materialization graph is generated. The forward materialization graph is converted to a set of vector representations comprising multidimensional numbers representing elements of the forward materialization graph. A set of inference paths is computed for the set of vector representations. An inference path in the set of inference paths connecting a first vector representation with a second vector representation. Based on a set of features, the set of vector representations is formed into clusters, a feature in the set of features comprising a relevance probability, the relevance probability corresponding to a relevance of a portion of the unstructured content according to a relevance metric. A structured representation of the unstructured content is placed at an edge location of a content delivery network determined using the set of clusters.

20 Claims, 13 Drawing Sheets

(51) Int. Cl.
*G06F 40/205* (2020.01)
*G06F 40/44* (2020.01)
*G06N 5/04* (2023.01)

(56) References Cited

U.S. PATENT DOCUMENTS

| | | | |
|---|---|---|---|
| 2012/0158639 A1* | 6/2012 | Moore | G06F 16/282 |
| | | | 706/55 |
| 2015/0055623 A1 | 2/2015 | Li et al. | |
| 2016/0314182 A1* | 10/2016 | Zhang | H04L 43/04 |
| 2018/0165554 A1* | 6/2018 | Zhang | G06F 18/2411 |
| 2019/0278787 A1* | 9/2019 | Kapur | G06Q 30/0269 |
| 2020/0052991 A1 | 2/2020 | Kodaypak et al. | |
| 2020/0059530 A1 | 2/2020 | Newton et al. | |
| 2020/0074002 A1* | 3/2020 | Kalia | G06F 16/3334 |
| 2020/0074321 A1 | 3/2020 | Chungapalli et al. | |
| 2020/0401908 A1* | 12/2020 | Ortega | G06V 10/762 |
| 2022/0179857 A1* | 6/2022 | Kompella | G06N 5/022 |

OTHER PUBLICATIONS

Wang et al., Edge and Cloud Collaborative Entity Recommendation Method towards the IoT Search, Sensors 2020k 20, 1918, Mar. 30, 2020.

Wu et al., Phrase2Vec: Phrase embedding based on parsing, vol. 517, May 2020, pp. 100-127.

IBM, Adding entities, IBM Cloud Docs, Watson Assistant (Managed), Sep. 16, 2020, https://cloud.IBM.com/docs/assistant?topic=assistant-entities.

Kaljahi et al., A Detailed Analysis of Phrase-based and Syntax-based Machine Translation: The Search for Systematic Differences, Oct. 2012.

Wikipedia, Transitive closure, Jan. 7, 2021, https://en.wikipedia.org/wiki/Transitive_closure.

Google Developers, Machine Learning Crash Course, 2020, https://developers.google.com/machine-learning/crash-course/feature-crosses/video-lecture.

Brownlee, 6 Dimensionality Reduction Algorithms With Python, Aug. 17, 2020, https://machinelearningmastery.com/dimensionality-reduction-algorithms-with-python/.

* cited by examiner

PHRASE BASED UNSTRUCTURED CONTENT PARSING

BACKGROUND

The present invention relates generally to a method, system, and computer program product for content parsing. More particularly, the present invention relates to a method, system, and computer program product for phrase based unstructured content parsing.

A content delivery network or content distribution network (CDN) is a geographically distributed network of proxy servers and their data centers. CDNs serve content over networks such as the Internet, including web objects (e.g. text, graphics, and scripts), downloadable objects (e.g. media files, software, and documents), applications (e.g. e-commerce and portals), live streaming media, on-demand streaming media, online gaming, and social networks. Because storing content at a central data center creates very large data loads at one network location and increased latency within the network, CDNs typically combine core data centers with edge data centers. The edge data centers cache the most popular content closer to end users for traffic load and latency reduction.

CDNs serve content to any device capable of communicating with the CDN. Because 5G mobile networking is faster than previous generations of mobile data communications, as 5G becomes available demand for content delivery over 5G is expected to increase. However, 5G networking typically uses a set of access points intended to serve a smaller geographic area than 4G access points, thus increasing the number of points at which content can be cached. 5G access points, because they serve a smaller area, often have less storage capacity than previous access points, thus requiring more precision in determining which content is cached where.

SUMMARY

The illustrative embodiments provide a method, system, and computer program product. An embodiment includes a method that generates, from an unstructured content using an ontology, a forward materialization graph, the forward materialization graph comprising a graphical representation of a set of relationships between a set of entities expressed in the unstructured content. An embodiment converts, to a set of vector representations, the forward materialization graph, a vector representation in the set of vector representations comprising a multidimensional number representing an element of the forward materialization graph. An embodiment computes, for the set of vector representations, a set of inference paths, an inference path in the set of inference paths connecting a first vector representation with a second vector representation. An embodiment clusters, based on a set of features, the set of vector representations, a feature in the set of features comprising a relevance probability, the relevance probability corresponding to a relevance of a portion of the unstructured content according to a relevance metric. An embodiment places, at an edge location of a content delivery network determined using the set of clusters, a structured representation of the unstructured content, the structured representation incorporating the set of inference paths and the set of clusters.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
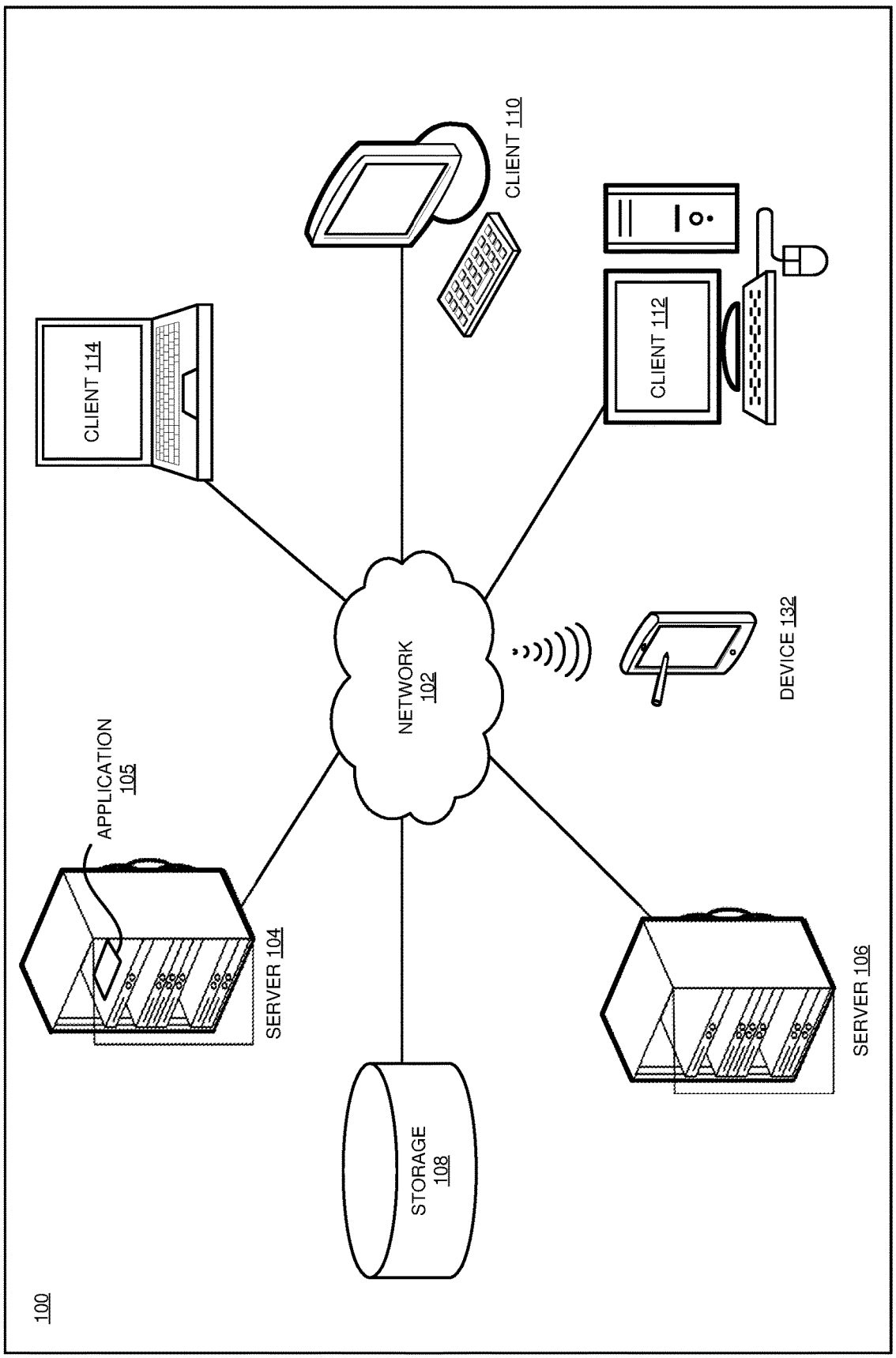
FIG. 1 depicts a block diagram of a network of data processing systems in which illustrative embodiments may be implemented.

The illustrative embodiments recognize that not all information in unstructured content, such as a natural language document, is equally relevant to all users of a document. For example, within an newspaper article reporting on recent merger and acquisition activity in the health care sector, one reader might be interested in the bare fact that one of the mergers had occurred in a particular year, another reader might be interested in merger trends over the last ten years, and a third reader might be interested in only one of the companies mentioned. In addition, relevance often changes over time. For example, a reader might read the same example article one day while looking for information on one particular company, and another day while analyzing long-term health care sector trends. However, although techniques are presently available to summarize and generate structured descriptions of unstructured content, such techniques do not take user relevance, or changing user relevance, into account. Consequently, the illustrative embodiments recognize that there is an unmet need to generate a structured description of unstructured content that are relevant to a user at a particular time.

The illustrative embodiments also recognize that, as the number of access points in a CDN increases and the amount of content provided via the CDN grows, optimizing content positioning at access points becomes more important in providing content delivery with the responsiveness users require. The CDN itself also becomes more complex, including many more access points and routers directing traffic between access points. Thus, one technique used in optimizing content positioning at access points involves determining which data is most likely to be accessed from a particular access point, and pre-positioning the desired data at the access point before the data is actually accessed. Thus, the illustrative embodiments also recognize that the ability to generate a structured description of unstructured content that are relevant to a user at a particular time would be helpful in determining which data to pre-position where.

The illustrative embodiments recognize that the presently available tools or solutions do not address these needs or provide adequate solutions for these needs. The illustrative embodiments used to describe the invention generally address and solve the above-described problems and other problems related to phrase based unstructured content parsing.

An embodiment can be implemented as a software application. The application implementing an embodiment can be configured as a modification of an existing content management system, as a separate application that operates in conjunction with an existing content management system, a standalone application, or some combination thereof.

Particularly, some illustrative embodiments provide a method that generates a forward materialization graph representing relationships between entities expressed in unstructured content, converts the forward materialization to a set of vector representations, computes a set of inference paths between vector representations, clusters the set of vector representations based on a set of features, and places a structured representation of the unstructured content incorporating the set of inference paths and the set of clusters at an edge location of a content delivery network.

An embodiment receives an unstructured content from which to generate a phrase based structured content description. One embodiment receives unstructured content in the form of a natural language document. Another embodiment receives unstructured content in the form of audio, video, a still-image presentation, or another non-textual form or combination of textual and non-textual content, and converts the non-textual content to natural language textual form using a presently-available technique. An embodiment also receives an ontology, which describes the properties of a set of concepts and categories in a subject area or domain and relationships between the concepts and categories. An embodiment also receives user content consumption history data, for use in determining relevance. For example, if a user has spent all day reading documents describing aspects of health care sector merger and acquisition activity over the last decade, an embodiment can assume that the user is interested in the health care sector or merger and acquisition activity. One embodiment receives user content consumption history data from a specific user. Another embodiment receives user content consumption history data from a group of users, for example users who have above a threshold similarity measure with a specific user. Another embodiment receives default user content consumption history data, for use when insufficient user-specific data is available.

An embodiment uses the ontology and user content consumption history data to generate a forward materialization graph from input unstructured content. A forward materialization graph is a graphical representation of a set of semantic relationships, such as inferences, between phrases, such as entities, expressed in the unstructured content. Entities are nouns or noun phrases. An ontology often includes known entities to be recognized within content, such as known names (e.g. for people, organizations, and objects), place names, temporal expressions, and certain types of numerical expressions. To generate a forward materialization graph, an embodiment extracts entities from the input content, and identifies relationships between entities, using any presently available technique, for example Name Entity Recognition (NER).

An embodiment converts the forward materialization graph to a set of vector representations, or embeddings. A vector representation is a multidimensional number, or a point in a multidimensional vector space. Vector representations are selected so that similarity between two items represented by vectors can be determined by computing a similarity measure, such as cosine similarity, between their corresponding vectors. Each vector representation represents a node, representing an entity, in the forward materialization graph, and the vector representations are selected based on graph edges representing relationships between entities.

In particular, to convert the forward materialization graph to a set of vector representations, one embodiment generates a set of random walks through the graph. A random walk is a sequence of discrete, fixed-length steps in pseudorandom directions. One embodiment generates n random walks, where n is the logarithm of the size of the input graph. Another embodiment generates a predetermined, constant number of random walks. Another embodiment generates all the random walks that are possible within the graph. In one embodiment, each walk proceeds from a pseudorandomly-selected starting point at a graph node until reaching a node that has already been touched. In another embodiment, each walk has a predetermined, constant length. In one embodiment, each step of a walk is from one node, along a graph edge, to the next node; other embodiments implement other step lengths. An embodiment uses a trained embedding model that treats each walk as a sentence, and each step, or node, within a walk as a word within the sentence. The model generates a set of embeddings corresponding to each walk, with each embedding corresponding to a graph node within the walk and relationships between embeddings corresponding to graph edges connecting nodes. As a result, the same node might be represented as multiple vectors, depending on which graph edges connect the node to other nodes.

An embodiment computes a set of inference paths for the set of vector representations. An inference path connects a vector representation with another vector representation, possibly through one or more additional vector representations. An embodiment performs a transitive reduction on the set of inference paths, by computing a length of one or more inference paths, then removing one or more higher-cost paths from the set of inference paths. If two inference paths connect the same endpoints, the higher-cost path is the longer path. Removing longer paths between the same endpoints simplifies the set of inference paths by removing redundant information.

An embodiment forms clusters in the set of vector representations. The clustering is based on one or more features. A feature is a probability that a portion of the unstructured content will be relevant to a user of the unstructured content. One embodiment forms feature crosses to determine clusters. A feature cross is a product of two features in the set of features. Techniques are presently available to form clusters based on features and feature crosses. An embodiment is configurable to adjust the number of data points included in a cluster.

An embodiment performs dimensionality reduction on the clustered vector representations. Dimensionality reduction simplifies the sets of clusters, removing data that is not relevant or redundant.

An embodiment incorporates the set of inference paths and the set of clusters into a structured representation of the original unstructured input. One embodiment uses the set of clusters to determine an edge location for the structured representation within a CDN, and places the structured representation at the edge location. Thus, the embodiment pre-positions data within the structured representation for anticipated use.

The manner of phrase based unstructured content parsing described herein is unavailable in the presently available methods in the technological field of endeavor pertaining to content management systems. A method of an embodiment described herein, when implemented to execute on a device or data processing system, comprises substantial advancement of the functionality of that device or data processing system in generating a forward materialization graph representing relationships between entities expressed in unstructured content, converting the forward materialization to a set of vector representations, computing a set of inference paths between vector representations, clustering the set of vector representations based on a set of features, and placing a structured representation of the unstructured content incorporating the set of inference paths and the set of clusters at an edge location of a content delivery network.

The illustrative embodiments are described with respect to certain types of contents, graphs, vector representations, features, clusters, links, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
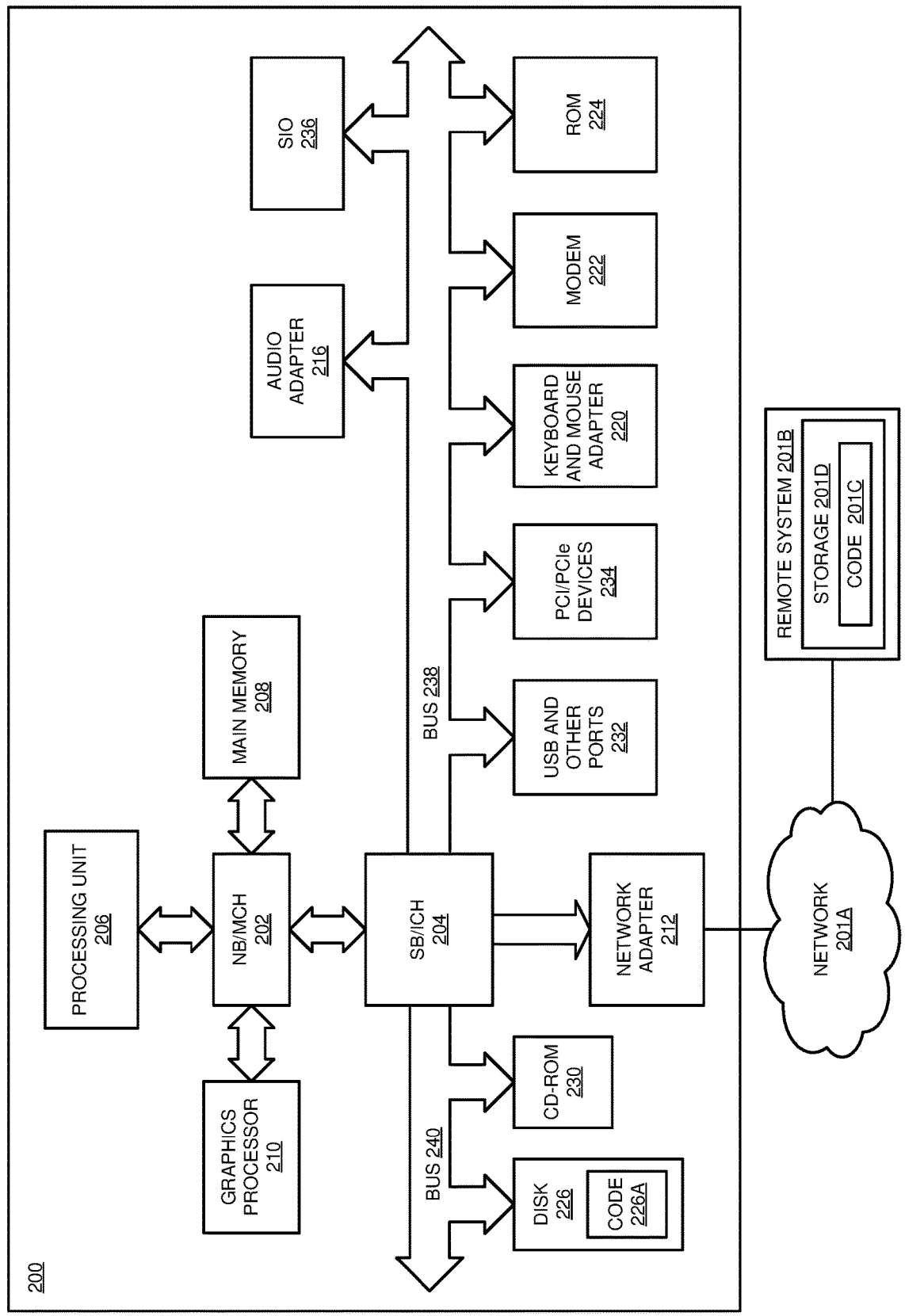
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
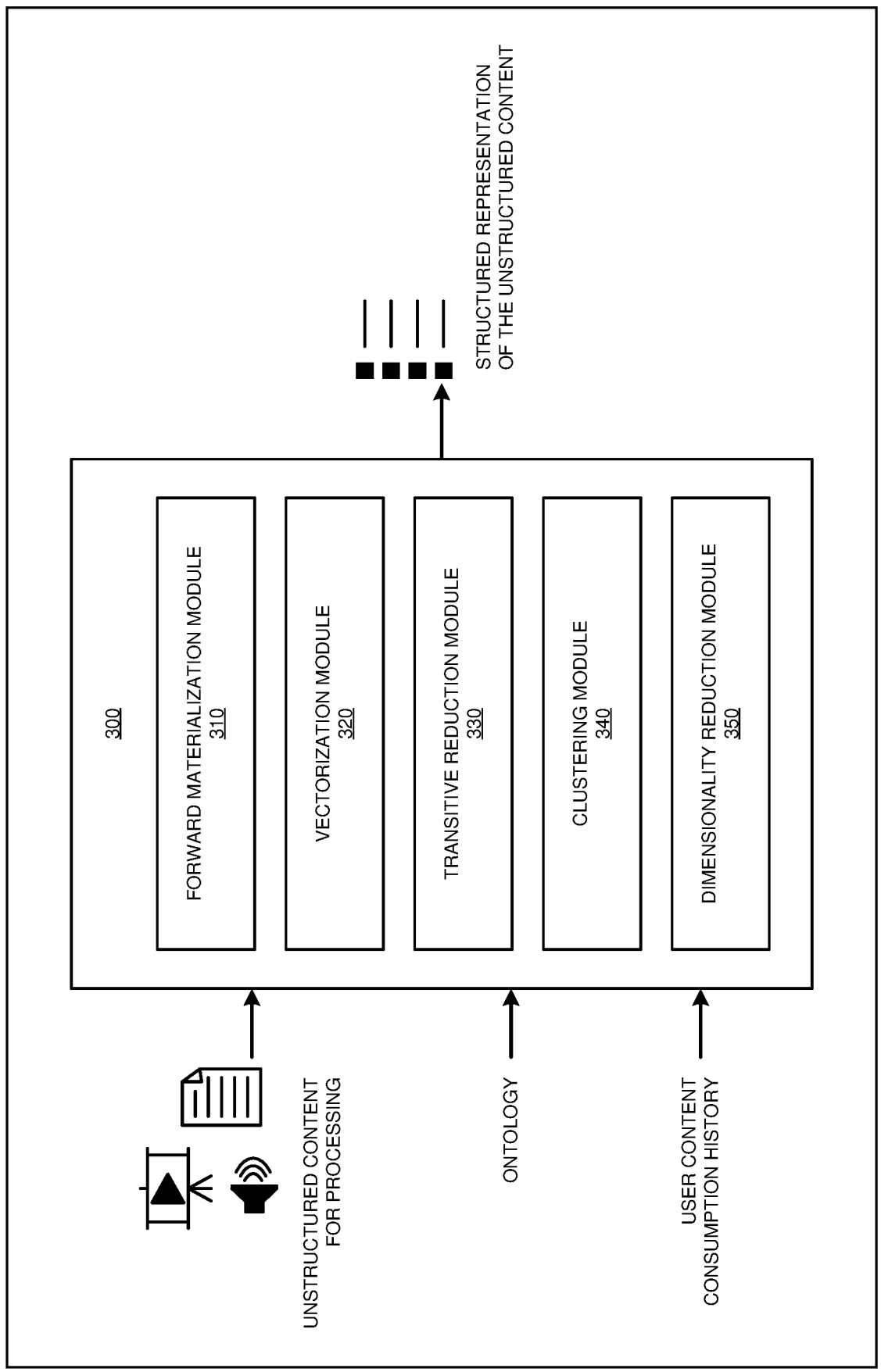
FIG. 3 depicts a block diagram of an example configuration for phrase based unstructured content parsing in accordance with an illustrative embodiment.

With reference to FIG. 3, this figure depicts a block diagram of an example configuration for phrase based unstructured content parsing in accordance with an illustrative embodiment. Application 300 is an example of application 105 in FIG. 1 and executes in any of servers 104 and 106, clients 110, 112, and 114, and device 132 in FIG. 1.

Forward materialization module 310 uses an ontology and user content consumption history data to generate a forward materialization graph from input unstructured content. In one implementation of module 310, the unstructured content unstructured content is in the form of a natural language document. In another implementation of module 310, the unstructured content is in the form of audio, video, a still-image presentation, or another non-textual form or combination of textual and non-textual content, and module 310 converts the non-textual content to natural language textual form using a presently-available technique.

Vectorization module 320 converts the forward materialization graph to a set of vector representations, or embeddings. More detail of module 320 is provided with reference to FIG. 5.

Inference path module 330 computes a set of inference paths for the set of vector representations, and removes higher-cost paths from the set of inference paths. More detail of module 330 is provided with reference to FIG. 6.

Clustering module 340 forms clusters in the set of vector representations. The clustering is based on one or more features or feature crosses. Module 340 is configurable to adjust the number of data points included in a cluster.

Dimensionality reduction module 350 performs dimensionality reduction on the clustered vector representations.

Application 300 incorporates the set of inference paths and the set of clusters into a structured representation of the original unstructured input. One implementation of application 300 uses the set of clusters to determine an edge location for the structured representation within a CDN, and places the structured representation at the edge location.

Figure 4:
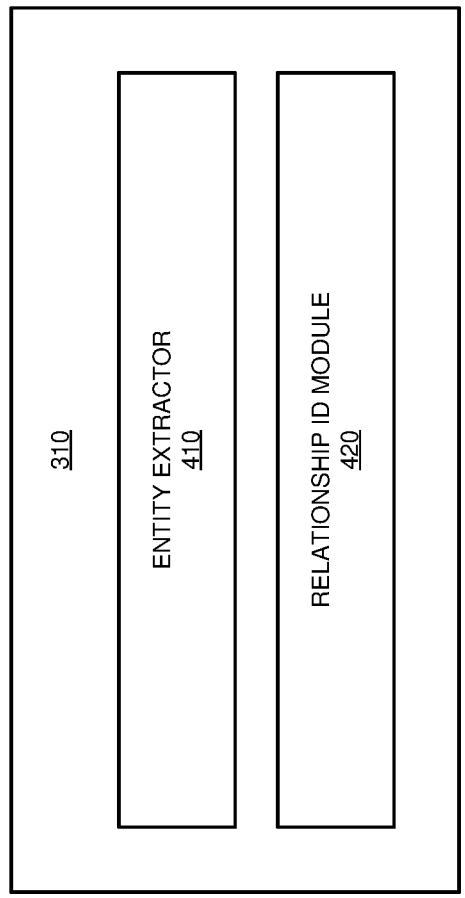
FIG. 4 depicts a block diagram of an example configuration for phrase based unstructured content parsing in accordance with an illustrative embodiment.

With reference to FIG. 4, this figure depicts a block diagram of an example configuration for phrase based unstructured content parsing in accordance with an illustrative embodiment. In particular, FIG. 4 depicts more detail of forward materialization module 310 in FIG. 3.

To generate a forward materialization graph, entity extraction module 410 extracts entities from the input content, using any presently available technique. Relationship identification module 420 identifies relationships between entities, using any presently available technique.

Figure 5:
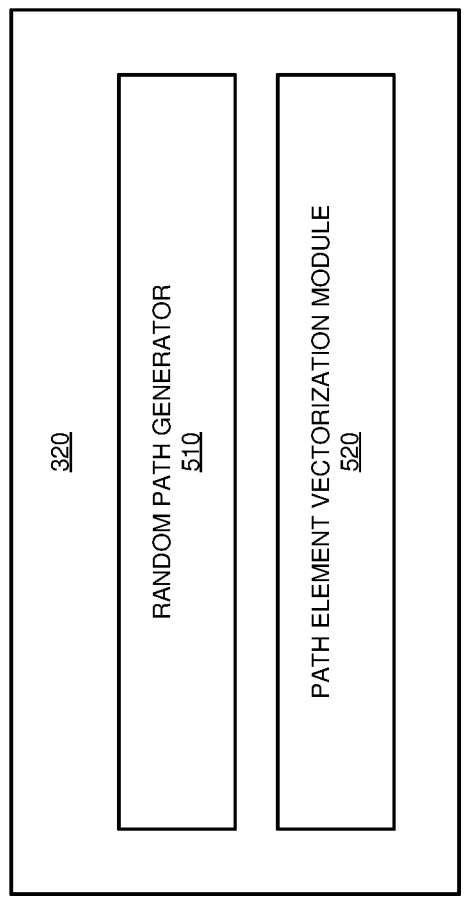
FIG. 5 depicts a block diagram of an example configuration for phrase based unstructured content parsing in accordance with an illustrative embodiment.

With reference to FIG. 5, this figure depicts a block diagram of an example configuration for phrase based unstructured content parsing in accordance with an illustrative embodiment. In particular, FIG. 5 depicts more detail of vectorization module 320 in FIG. 3.

To convert the forward materialization graph to a set of vector representations, random path generator 510 generates a set of random walks through the graph. One implementation of random path generator 510 generates n random walks, where n is the logarithm of the size of the input graph. Another implementation of random path generator 510 generates a predetermined, constant number of random walks. Another implementation of random path generator 510 generates all the random walks that are possible within the graph. In one implementation of random path generator 510, each walk proceeds from a pseudorandomly-selected starting point at a graph node until reaching a node that has already been touched. In another implementation of random path generator 510, each walk has a predetermined, constant length. In one embodiment, each step of a walk is from one node, along a graph edge, to the next node; other embodiments implement other step lengths.

Path element vectorization module 520 uses a trained embedding model that treats each walk as a sentence, and each step, or node, within a walk as a word within the sentence. The model generates a set of embeddings corresponding to each walk, with each embedding corresponding to a graph node within the walk and relationships between embeddings corresponding to graph edges connecting nodes. As a result, the same node might be represented as multiple vectors, depending on which graph edges connect the node to other nodes.

Figure 6:
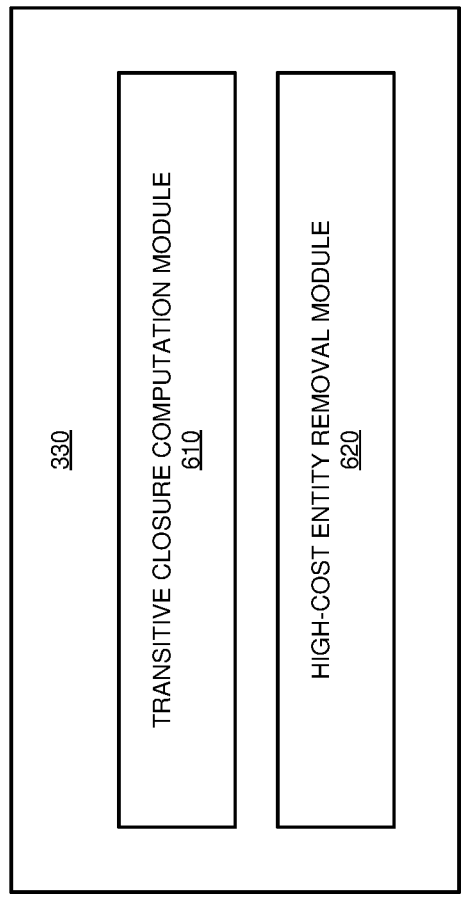
FIG. 6 depicts a block diagram of an example configuration for phrase based unstructured content parsing in accordance with an illustrative embodiment.

With reference to FIG. 6, this figure depicts a block diagram of an example configuration for phrase based unstructured content parsing in accordance with an illustrative embodiment. In particular, FIG. 6 depicts more detail of inference path module 330 in FIG. 3.

Path module 610 computes a set of inference paths for the set of vector representations. Transitive closure computation module 620 computes a length of one or more inference paths. High-cost path removal module 630 removing one or more higher-cost paths from the set of inference paths. If two inference paths connect the same endpoints, the higher-cost path is the longer path. Removing longer paths between the same endpoints simplifies the set of inference paths by removing redundant information.

Figure 7:
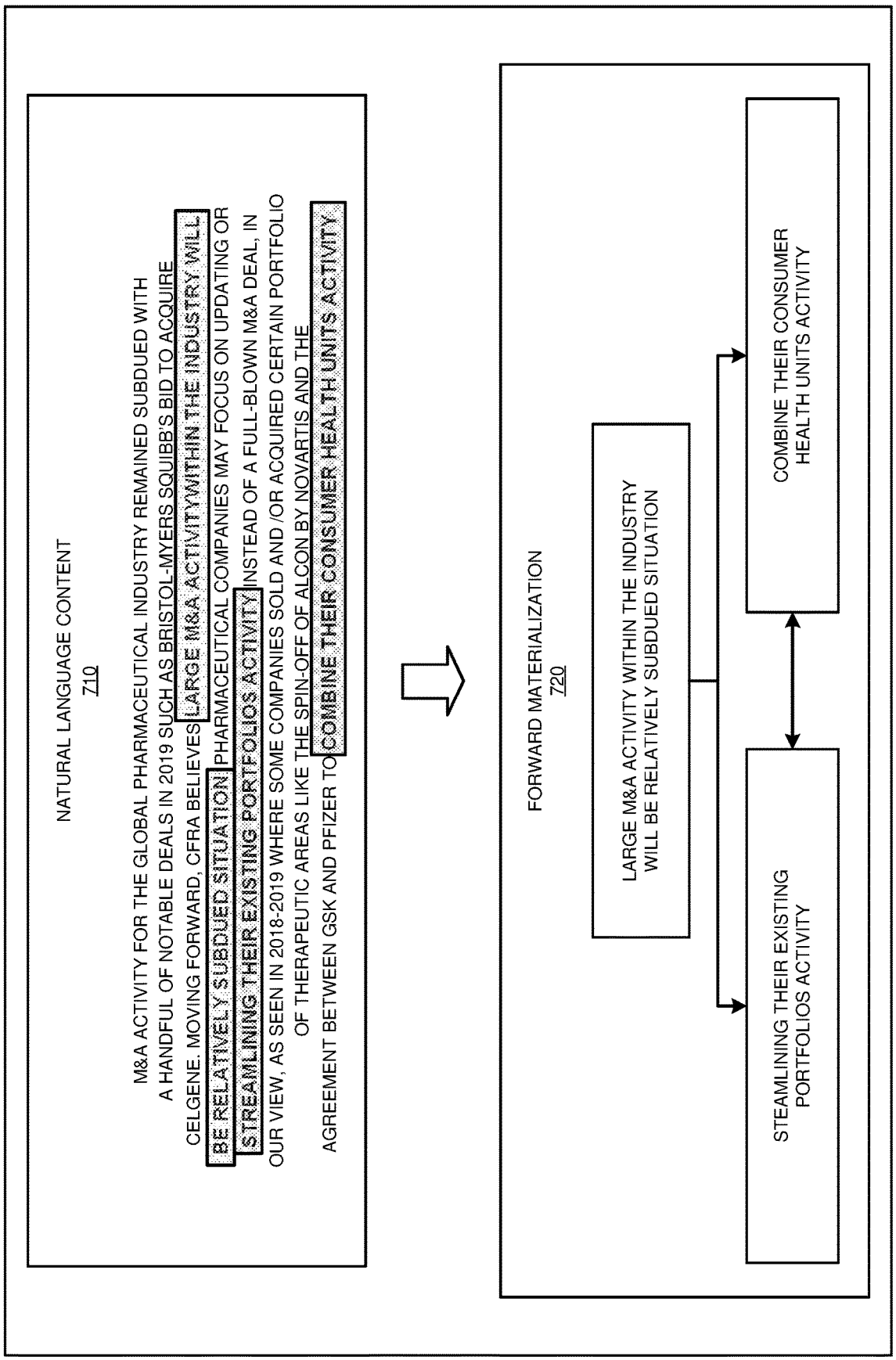
FIG. 7 depicts an example of phrase based unstructured content parsing in accordance with an illustrative embodiment.

With reference to FIG. 7, this figure depicts an example of phrase based unstructured content parsing in accordance with an illustrative embodiment. The example can be executed using application 300 in FIG. 3.

As depicted, natural language content 710 is an extract from a larger natural language document, identifying several phrases. Application 300 has generated forward materialization graph 720 from content 710, depicting a set of semantic relationships, such as inferences, between concepts expressed in the unstructured content.

Figure 8:
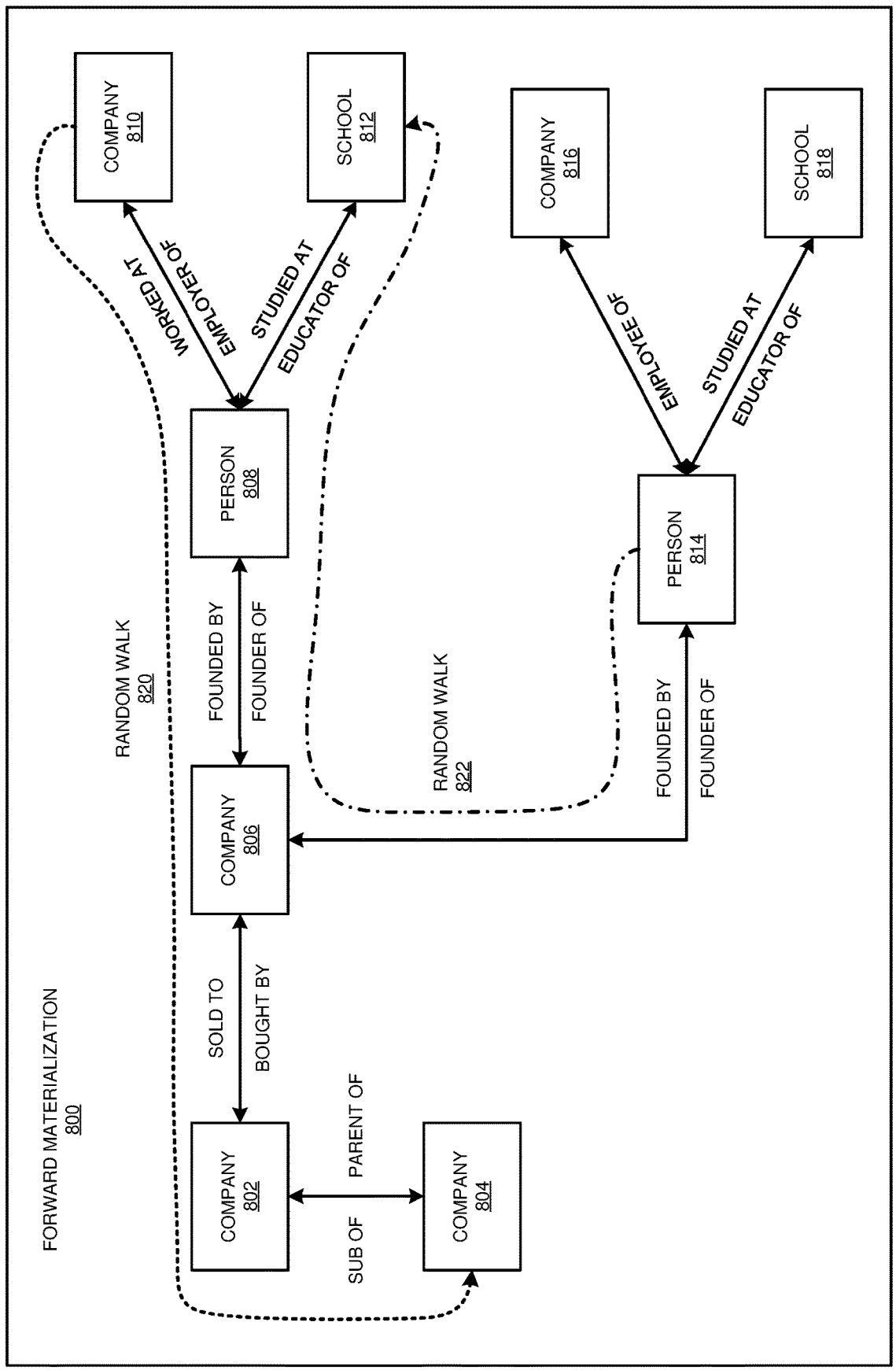
FIG. 8 depicts an example of phrase based unstructured content parsing in accordance with an illustrative embodiment.

With reference to FIG. 8, this figure depicts an example of phrase based unstructured content parsing in accordance with an illustrative embodiment. The example can be executed using application 300 in FIG. 3.

Forward materialization graph 800 depicts relationships among companies 802, 804, 806, 810, and 816, persons 808 and 814, and schools 812 and 818. For example, company 802 is a parent company of company 804, hence company 804 is a subsidiary of company 802. Similarly, company 806 was founded by person 808, who previously worked at 810 and studied at school 812.

Application 300 has generated random walks 820 and 822, for use in vectorizing elements of graph 800. Random walk 820 starts at company 810 and proceeds in a random direction at each node until reaching company 804. At company 804 the only path is towards company 802, which has already been touched, so the walk ends. Random walk 822 starts at person 814 and proceeds in a random direction at each node until reaching school 812. At school 812 the only path is towards person 808, which has already been touched, so the walk ends.

Figure 9:
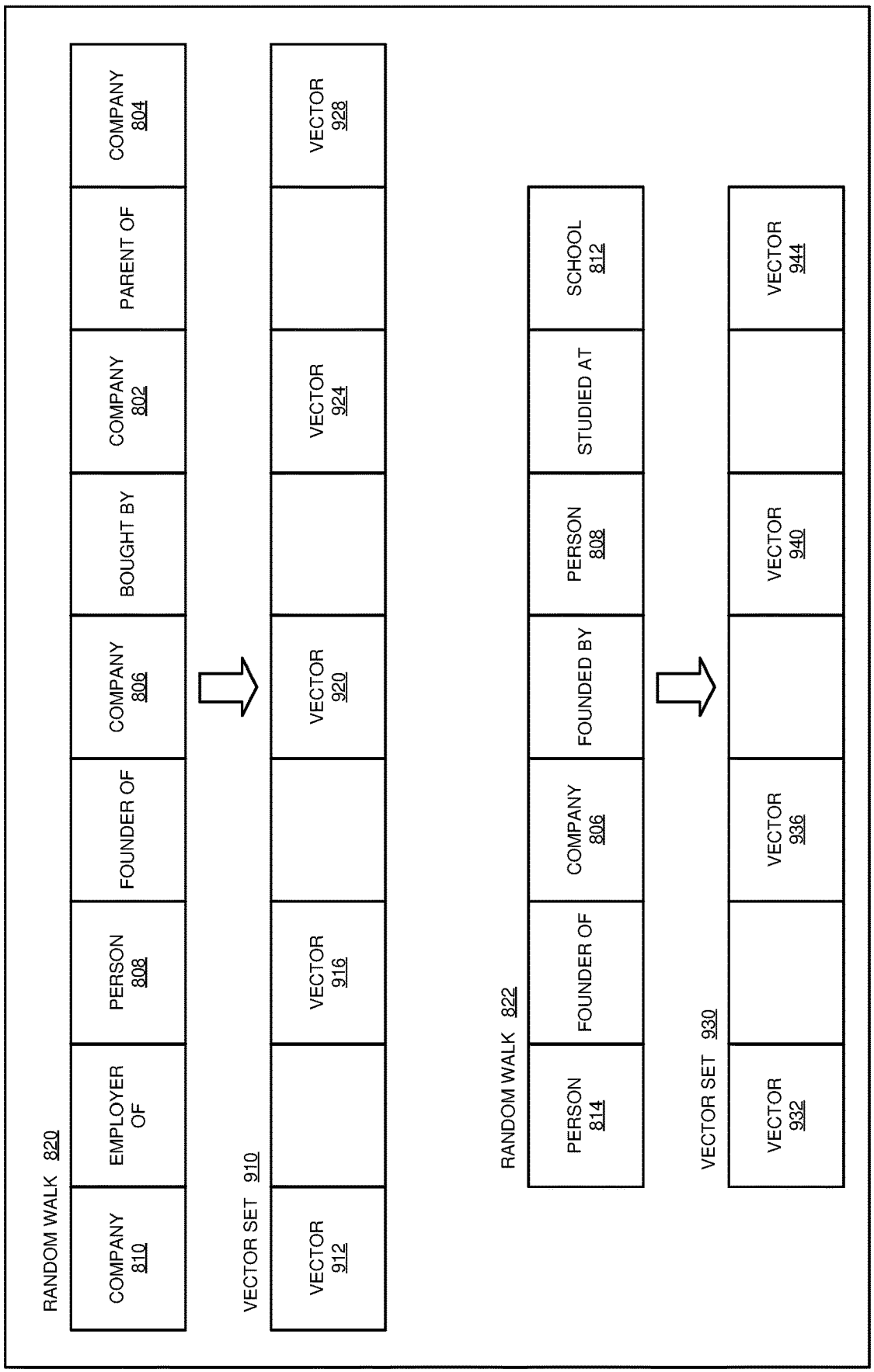
FIG. 9 depicts a continued example of phrase based unstructured content parsing in accordance with an illustrative embodiment.

With reference to FIG. 9, this figure depicts a continued example of phrase based unstructured content parsing in accordance with an illustrative embodiment. Random walks 820 and 822, companies 802, 804, 806, and 810, persons 808 and 814, and school 812 are the same as random walks 820 and 822, companies 802, 804, 806, and 810, persons 808 and 814, and school 812 in FIG. 8.

Vector set 910 corresponds to random walk 820. Hence, vectors 912, 916, 920, 924, and 928 are vector representations of company 810, person 808, company 806, company 802, and company 804 respectively. Vector set 930 corresponds to random walk 822. Hence, vectors 932, 936, 940, and 944 are vector representations of person 814, company 806, person 808, and school 812 respectively.

Figure 10:
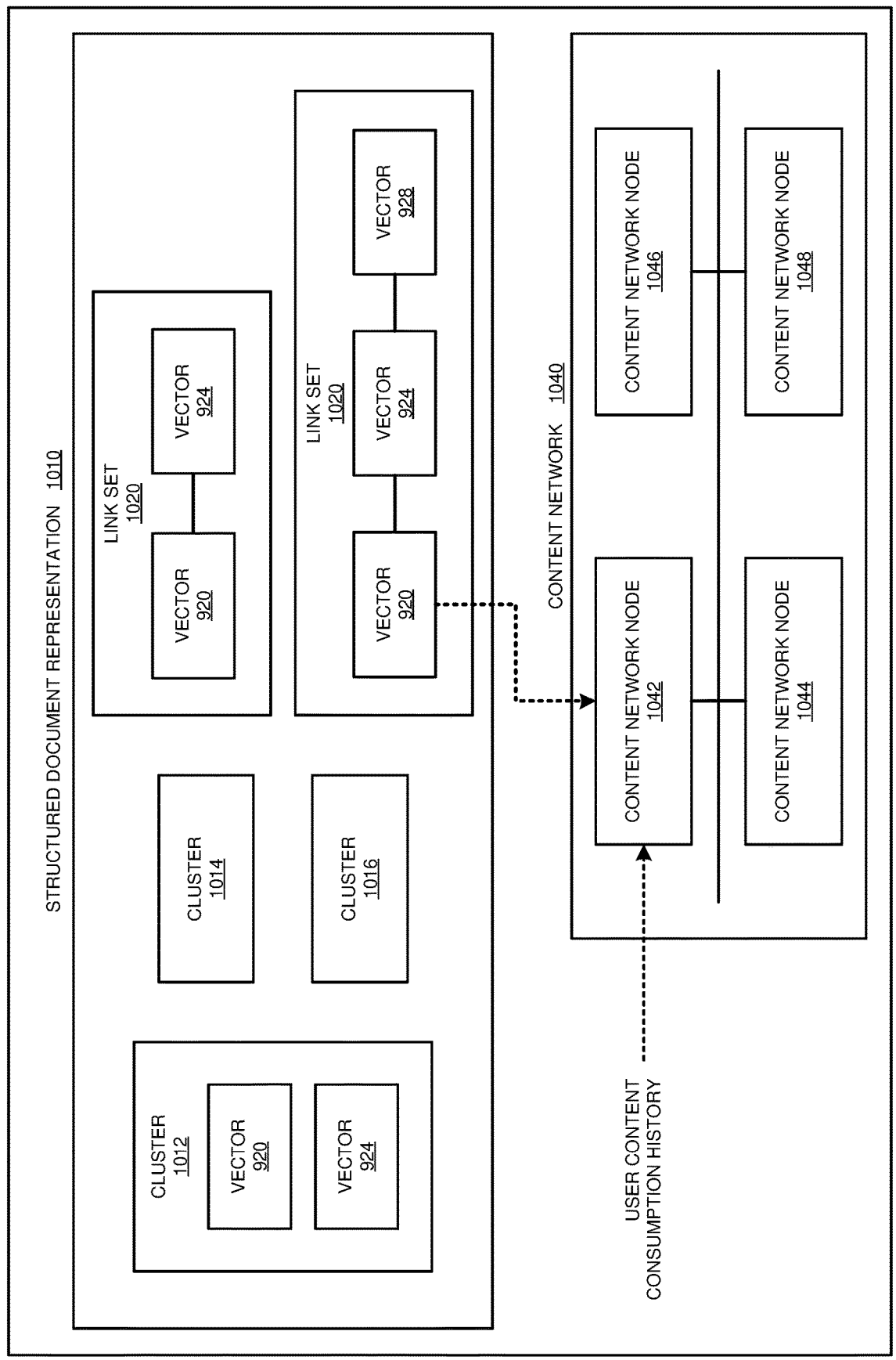
FIG. 10 depicts a continued example of phrase based unstructured content parsing in accordance with an illustrative embodiment.

With reference to FIG. 10, this figure depicts a continued example of phrase based unstructured content parsing in accordance with an illustrative embodiment. Vectors 920, 924, and 928 are the same as vectors 920, 924, and 928 in FIG. 9.

Application 300 has generated structured document representation 1010. Representation 1010 includes vector clusters 1012, 1014, and 1016. Cluster 1012 includes vector 920 and vector 924 because the two vectors share a feature. Representation 1010 also includes inference sets 1020 and 1022. Inference set 1020 includes inferences between vectors 920 and 924. Inference set 1022 includes inferences between vectors 920, 924, and 928. Thus, application 300 places structured document representation 1010 within content network node 1042 of content network 1040. Content network 1040 also includes content network nodes 1044, 1046, and 1048.

Figure 11:
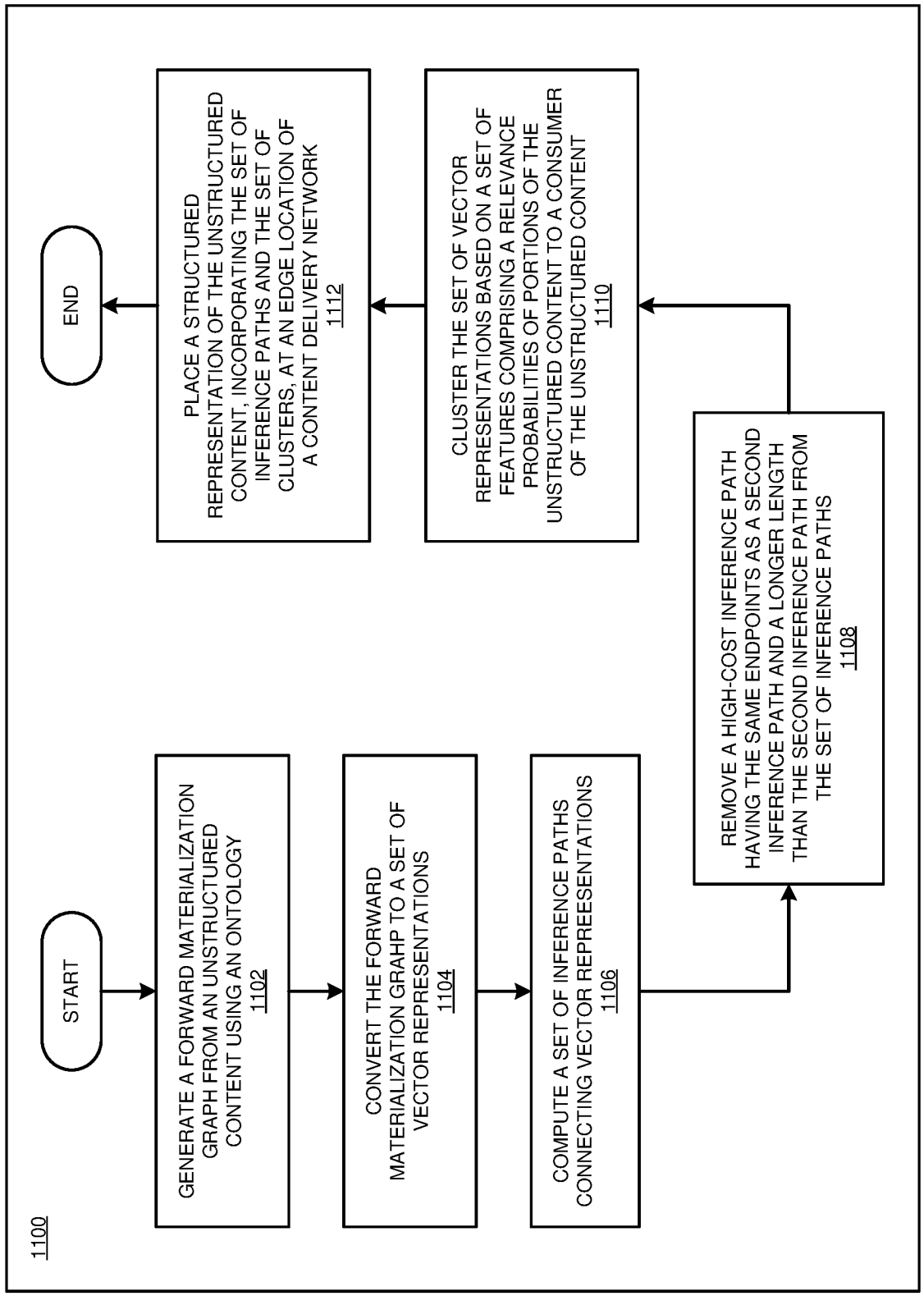
FIG. 11 depicts a flowchart of an example process for phrase based unstructured content parsing in accordance with an illustrative embodiment.

With reference to FIG. 11, this figure depicts a flowchart of an example process for phrase based unstructured content parsing in accordance with an illustrative embodiment. Process 1100 can be implemented in application 300 in FIG. 3.

In block 1102, the application generates a forward materialization graph from an unstructured content using an ontology. In block 1104, the application converts the forward materialization graph to a set of vector representations. In block 1106, the application computes a set of inference paths connecting vector representations. In block 1108, the application removes a high-cost inference path having the same endpoints as a second inference path and a longer length than the second inference path from the set of inference paths. In block 1110, the application clusters the set of vector representations based on a set of features comprising a relevance probabilities of portions of the unstructured content to a user of the unstructured content. In block 1112, the application places a structured representation of the unstructured content, incorporating the set of inference paths and the set of clusters, at an edge location of a content delivery network. Then the application ends.

Figure 12:
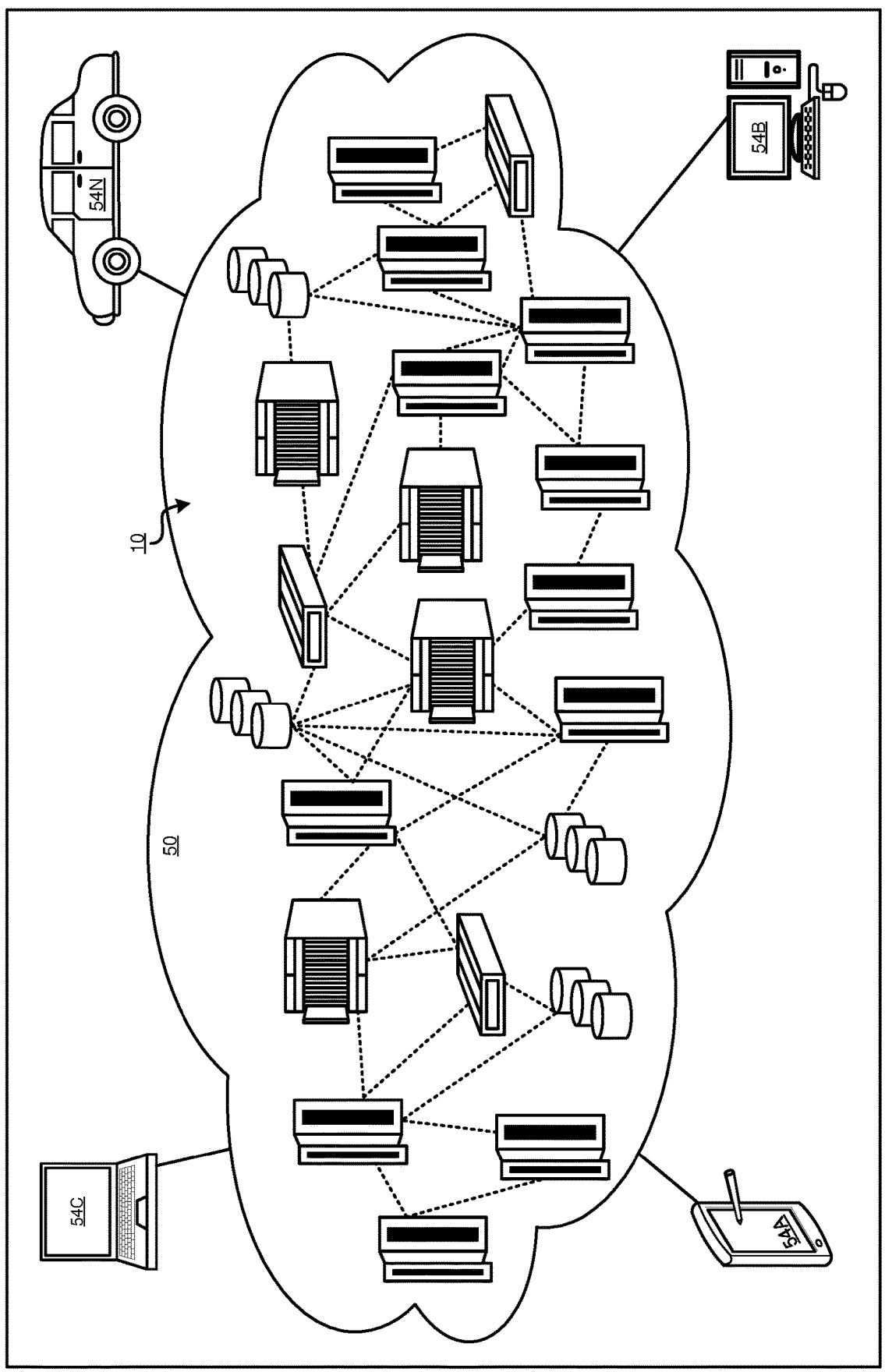
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 13:
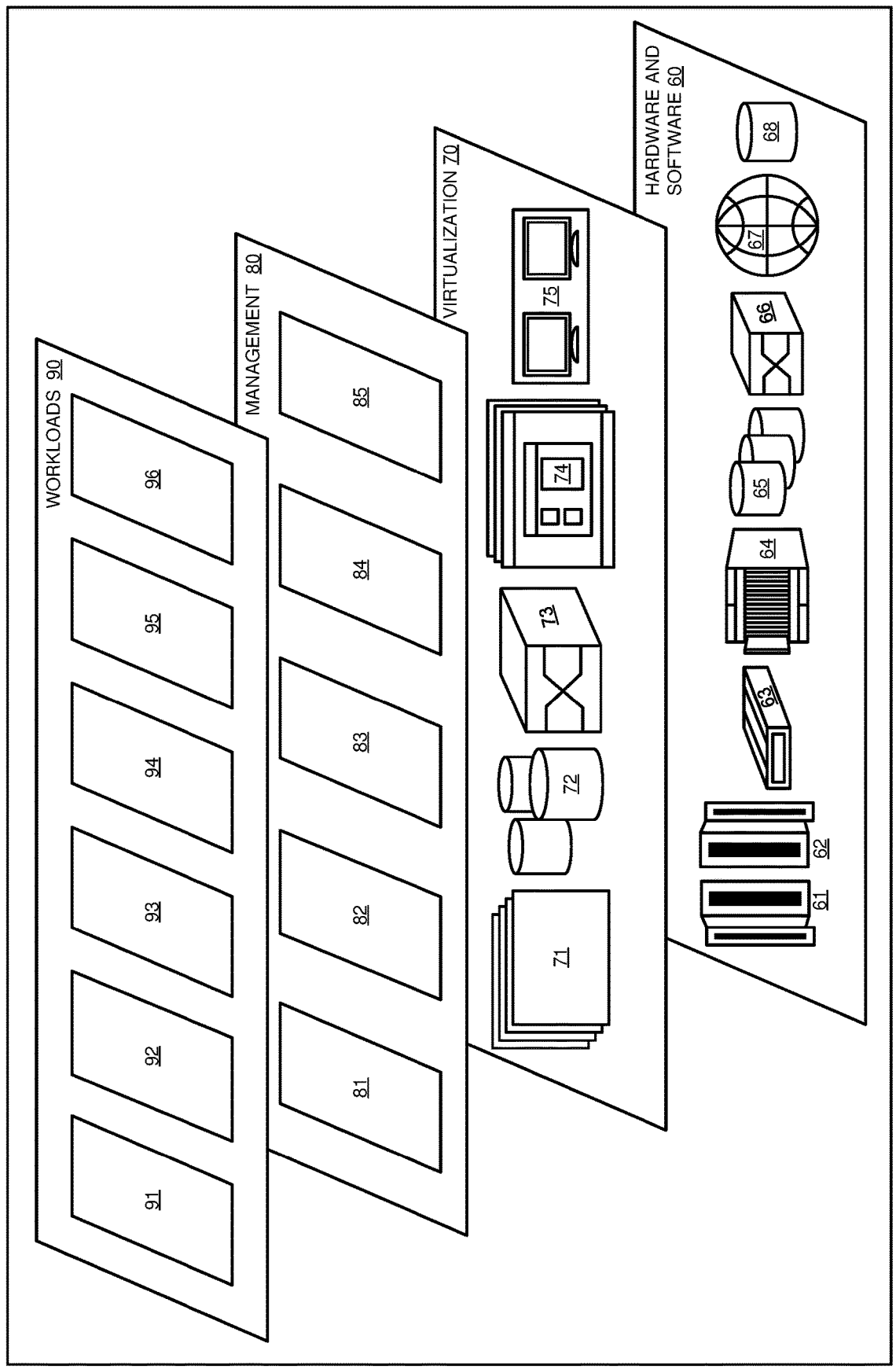
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for phrase based unstructured content parsing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    generating, from an unstructured content using an ontology, a forward materialization graph, the forward materialization graph comprising a graphical representation of a set of relationships between a set of entities expressed in the unstructured content;
    converting, to a set of vector representations, the forward materialization graph, a vector representation in the set of vector representations comprising a multidimensional number representing an element of the forward materialization graph;
    computing, for the set of vector representations, a set of inference paths, an inference path in the set of inference paths connecting a first vector representation with a second vector representation;
    clustering, into a set of clusters based on a set of features, the set of vector representations, each feature in the set of features comprising a relevance probability, the relevance probability corresponding to a relevance of a portion of the unstructured content according to a relevance metric; and
    placing, at a specified edge location of a content delivery network determined using the set of clusters, a structured representation of the unstructured content, the structured representation incorporating the set of inference paths and the set of clusters.

2. The computer-implemented method of claim 1, wherein the forward materialization graph is generated using a content consumption history.

3. The computer-implemented method of claim 1, further comprising:
    generating, using the forward materialization graph, a random walk, the random walk comprising a path within the forward materialization graph from a pseudorandomly selected starting point along a pseudorandomly selected graph edge.

4. The computer-implemented method of claim 3, further comprising:
    generating, for each node in the random walk, a corresponding vector representation.

5. The computer-implemented method of claim 1, further comprising:
    removing, from the set of inference paths, a high-cost inference path, the high-cost inference path having the same endpoints as a second inference path and a longer length than the second inference path.

6. The computer-implemented method of claim 1, wherein the set of features comprises a feature cross, the feature cross comprising a product of two features in the set of features.

7. The computer-implemented method of claim 1, further comprising:
    performing, on the set of clusters, a dimensionality reduction.

8. The computer-implemented method of claim 1, wherein the relevance metric is produced from a user input indicative of a relevance of the portion to a user of the unstructured content.

9. A computer program product for content parsing, the computer program product comprising:
    one or more computer readable storage media, and program instructions collectively stored on the one or more computer readable storage media, the program instructions comprising:
    program instructions to generate, from an unstructured content using an ontology, a forward materialization graph, the forward materialization graph comprising a graphical representation of a set of relationships between a set of entities expressed in the unstructured content;
    program instructions to convert, to a set of vector representations, the forward materialization graph, a vector representation in the set of vector representations comprising a multidimensional number representing an element of the forward materialization graph;
    program instructions to compute, for the set of vector representations, a set of inference paths, an inference path in the set of inference paths connecting a first vector representation with a second vector representation;
    program instructions to cluster, into a set of clusters based on a set of features, the set of vector representations, each feature in the set of features comprising a relevance probability, the relevance probability corresponding to a relevance of a portion of the unstructured content according to a relevance metric; and
    program instructions to place, at a specified edge location of a content delivery network determined using the set of clusters, a structured representation of the unstructured content, the structured representation incorporating the set of inference paths and the set of clusters.

10. The computer program product of claim 9, wherein the forward materialization graph is generated using a content consumption history.

11. The computer program product of claim 9, further comprising:
    program instructions to generate, using the forward materialization graph, a random walk, the random walk comprising a path within the forward materialization graph from a pseudorandomly selected starting point along a pseudorandomly selected graph edge.

12. The computer program product of claim 11, further comprising:
program instructions to generate, for each node in the random walk, a corresponding vector representation.

13. The computer program product of claim 9, further comprising:
program instructions to remove, from the set of inference paths, a high-cost inference path, the high-cost inference path having the same endpoints as a second inference path and a longer length than the second inference path.

14. The computer program product of claim 9, wherein the set of features comprises a feature cross, the feature cross comprising a product of two features in the set of features.

15. The computer program product of claim 9, further comprising:
program instructions to perform, on the set of clusters, a dimensionality reduction.

16. The computer program product of claim 9, wherein the relevance metric is produced from a user input indicative of a relevance of the portion to a user of the unstructured content.

17. The computer program product of claim 9, wherein the stored program instructions are stored in the at least one of the one or more storage media of a local data processing system, and wherein the stored program instructions are transferred over a network from a remote data processing system.

18. The computer program product of claim 9, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 9, wherein the computer program product is provided as a service in a cloud environment.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to generate, from an unstructured content using an ontology, a forward materialization graph, the forward materialization graph comprising a graphical representation of a set of relationships between a set of entities expressed in the unstructured content;
program instructions to convert, to a set of vector representations, the forward materialization graph, a vector representation in the set of vector representations comprising a multidimensional number representing an element of the forward materialization graph;
program instructions to compute, for the set of vector representations, a set of inference paths, an inference path in the set of inference paths connecting a first vector representation with a second vector representation;
program instructions to cluster, into a set of clusters based on a set of features, the set of vector representations, each feature in the set of features comprising a relevance probability, the relevance probability corresponding to a relevance of a portion of the unstructured content according to a relevance metric; and
program instructions to place, at a specified edge location of a content delivery network determined using the set of clusters, a structured representation of the unstructured content, the structured representation incorporating the set of inference paths and the set of clusters.

* * * * *